(12) United States Patent
Thangam

(10) Patent No.: US 11,409,640 B2
(45) Date of Patent: Aug. 9, 2022

(54) MACHINE LEARNING BASED TEST CASE PREDICTION AND AUTOMATION LEVERAGING THE HTML DOCUMENT OBJECT MODEL

(71) Applicant: SAP SE, Walldorf (DE)

(72) Inventor: Sathiyanarayanan Thangam, Bangalore (IN)

(73) Assignee: SAP SE, Walldorf (DE)

( * ) Notice: Subject to any disclaimer, the term of this patent is extended or adjusted under 35 U.S.C. 154(b) by 525 days.

(21) Appl. No.: 16/408,074

(22) Filed: May 9, 2019

(65) Prior Publication Data

US 2020/0356466 A1    Nov. 12, 2020

(51) Int. Cl.
*G06F 11/36* (2006.01)
*G06F 3/0482* (2013.01)
*G06N 20/00* (2019.01)
*G06F 40/12* (2020.01)

(52) U.S. Cl.
CPC ........ *G06F 11/3684* (2013.01); *G06F 3/0482* (2013.01); *G06F 11/3692* (2013.01); *G06F 40/12* (2020.01); *G06N 20/00* (2019.01)

(58) Field of Classification Search
CPC ............. G06F 11/3684; G06F 11/3692; G06F 3/0482; G06F 40/12; G06N 20/00
See application file for complete search history.

(56) References Cited

U.S. PATENT DOCUMENTS

| 8,370,809 B2 | 2/2013 | Lawrance et al. |
| 8,612,806 B2 | 12/2013 | Rossi |
| 9,038,032 B2 | 5/2015 | Li et al. |
| 9,274,934 B2 | 3/2016 | Chandra et al. |
| 9,355,020 B2 | 5/2016 | Schur et al. |
| 9,852,049 B2 | 12/2017 | Hey et al. |
| 11,074,160 B2 * | 7/2021 | Sudhakaran .......... G06F 40/268 |

(Continued)

OTHER PUBLICATIONS

Stefan et al., "Assisted Test Case Design Using Contextual Information by DOM Exploration", published by IEEE, pp. 1-4 (Year: 2014).*

(Continued)

*Primary Examiner* — S. Sough
*Assistant Examiner* — Zheng Wei
(74) *Attorney, Agent, or Firm* — Klarquist Sparkman, LLP

(57) ABSTRACT

Techniques are described for predicting test scenarios and generating test case documents and/or automation scripts using machine-learning algorithms. For example, input may be received representing a web page, and an HTML Document Object Model (DOM) of the web page may be analyzed. From the DOM, a plurality of HTML elements may be extracted and processed by a machine-learning algorithm. Based on the processed plurality of HTML elements, a plurality of predictions for test case scenarios may be generated, and converted into a set of human-readable instructions, such as a test case document, and/or a set of machine-readable instructions, such as an automation script. In some instances, a user selection of at least one predicted test scenario from a displayed list of one or more predicted test scenarios is received and corresponding human-readable instructions and/or machine-readable instructions are generated for the selected scenario(s).

20 Claims, 10 Drawing Sheets

(56) References Cited

U.S. PATENT DOCUMENTS

| | | | | |
|---|---|---|---|---|
| 2008/0115114 A1* | 5/2008 | Palaparthi | ........... | G06F 11/3688 717/128 |
| 2010/0180256 A1* | 7/2010 | Gorthi | ................. | G06F 11/3684 717/124 |
| 2013/0097586 A1* | 4/2013 | Chandra | ............. | G06F 11/3684 717/124 |
| 2013/0339798 A1* | 12/2013 | Choudhary | ......... | G06F 11/3684 714/38.1 |
| 2013/0346948 A1* | 12/2013 | Zhang | ................. | G06F 11/3696 717/125 |
| 2017/0192882 A1* | 7/2017 | Bhagavathiammal | ........................ | G06F 11/3684 |
| 2019/0384699 A1* | 12/2019 | Arbon | ................. | G06F 11/3692 |

OTHER PUBLICATIONS

Paul et al., "An Approach of Automated Testing on Web Based Platform Using Machine Learning and Selenium", published by IEEE, Proceedings of the International Conference on Inventive Research in Computing Applications (ICIRCA 2018), pp. 851-856 (Year: 2018).*

Infostretch.com, "How Digital Transformation is Redefining Test and QA" [online], retrieved from the internet on Aug. 5, 2019; URL <https://www.infostretch.com/blog/how-digital-transformation-is-redefining-test-and-qa/>.

Infostretch.com, "The Impact of Digital Transformation on Testing and QA," [online], retrieved from the internet on Aug. 5, 2019; URL <https://www.infostretch.com/resources/white-papers/the-impact-of-digital-transformation-on-testing-qa/>.

Keyvanpour et al., "Automatic Software Test Case Generation," *Journal of Software Engineering* 5(3): 91-101, 2011.

Lambdatest.com, "Machine Learning for Automation Testing" [online], Aug. 5, 2017 (Aug. 5, 2017), retrieved from the internet on Aug. 5, 2019; <URL https://www.lambdatest.com/blog/machine-learning-for-automation-testing/>.

Raghuwanshi, "AI and Software Testing," presented at the 17th Annual International Software Testing Conference, retrieved from the internet on Aug. 5, 2019; URL <http://qaistc.com/2017/wp-content/uploads/2017/12/stc-2017_final-round-ppt-ai-and-software-testing-vikram-raghuwanshi.pdf>.

* cited by examiner

"Add" Test Case

1. Click on Settings and Adjust the columns. <Optional Step>.
2. Click on Add button
3. Fill in the following text input fields:
   - House Bank Acct ID
   - Bank Statement No.
   - Statement Status.
   - House Bank
   - Pmnt Tran Type Group
   - Opening Balance
   - Company Code
   - Bank Statement Date
   - Closing Balance
4. Click on Save button.
   *Alternative Step*: Click on Cancel button.

SOFTWARE 980 IMPLEMENTING DESCRIBED TECHNOLOGIES

MACHINE LEARNING BASED TEST CASE PREDICTION AND AUTOMATION LEVERAGING THE HTML DOCUMENT OBJECT MODEL

FIELD

The present disclosure generally relates to test case prediction and automation for an HTML-based graphical user interface application, such as a web page.

BACKGROUND

Computer applications generally have at least one of two types of interfaces. The first type of interface, a command line interface, requires a user to type in one or more text commands at, e.g., a "command prompt," which the computer then interprets and can respond to by performing various functions. A second type of interface that is in widespread use today is commonly referred to as a Graphical User Interface, or "GUI." Rather than relying solely on text entry, GUIs may provide a variety of mechanisms to permit a user to use, e.g., a mouse, keyboard, touch screen or other input device, to make selections in a visual presentation and to enter information and/or make selections, which are then translated into instructions for the computer. A typical GUI may include controls such as buttons, icons, menus, tool bars, windows, etc.

In order to ensure that a given application is functioning as intended, application developers may wish to conduct GUI testing to ensure that the input mechanisms in a given application are functioning properly, whether individually, or in conjunction with one another.

Test cases are a set of human-readable instructions that may be used for testing the functionality of a software application by a tester in order to certify that the functionality being tested is free of errors or "bugs." An example test case for a GUI may comprise a series of steps arranged in sequence, e.g., in a test case document, which can then be used by the human tester to test the functionality of the software application.

Historically, generating these test cases has relied on a time-consuming process of a user reviewing a web application or web page, e.g., an HTML-based web page, and—based on the user's understanding of the functionality contained therein—manually preparing a "test case document", manually adding to a test case document each of the steps required to test the various functionalities contained in the web page or application. Using this approach, the more complicated a given HTML page, the more time-consuming the process.

Additionally, these test cases may serve as inputs for an automation tester that can create machine-readable automation scripts that can be used for the system to perform the testing, without a user having to manually perform each of the testing steps. Once a test case document is generated, it can then be used as an input to an automation tester to form machine readable instructions, sometimes referred to as an "automate", which may be, e.g., a script that ensures functionality of the web page is working as expected. For example, an automate may be used to ensure that an e-commerce website is working as expected (e.g., a user may login, make purchases, cancel orders, etc.). The automation script(s), based on the initially manually created test case document(s) determines whether these functionalities are working properly.

Therefore, a need exists for methods and/or systems that improve the ability to automatically predict and/or generate test cases and corresponding automates.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for utilizing machine learning algorithms, as applied to the elements contained within an HTML DOM model for a web page to generate predictions for test case scenarios, and to convert these predictions into human readable instructions, such as test case documents, machine-readable instructions, such as test case automates, or both.

For example, in one embodiment, a computer-implemented method comprises: receiving an input representing a web page, the page comprising a plurality of HTML elements; analyzing an HTML Document Object Model (DOM) of the web page; extracting from the DOM the plurality of HTML elements; processing the extracted plurality of HTML elements utilizing a machine learning algorithm; generating, based on the processing the extracted plurality of HTML elements, at least one prediction for at least one test case scenario from the processed HTML elements; and converting the at least one prediction into: a set of human-readable instructions, and a set of machine-readable instructions.

In another embodiment, a computing system comprises: one or more memories; one or more processors coupled to the one or more memories; and one or more non-transitory computer readable storage media storing instructions that, when executed, cause the one or more processors to perform operations for predicting test cases for a web page, the operations comprising: receiving an input representing the web page, the page comprising a plurality of HTML elements; analyzing an HTML Document Object Model (DOM) of the web page; extracting from the DOM the plurality of HTML elements; processing the extracted plurality of HTML elements utilizing a machine learning algorithm; generating, based on the processing the extracted plurality of HTML elements, at least one prediction for at least one test case scenario from the processed HTML elements; and converting the at least one prediction into: a set of human-readable instructions, and a set of machine-readable instructions.

In still another embodiment, a computer-implemented method comprises: receiving an input representing a web page, the page comprising a plurality of HTML elements; analyzing an HTML Document Object Model (DOM) of the web page; extracting from the DOM the plurality of HTML elements; processing the extracted plurality of HTML elements utilizing a machine learning algorithm; generating, based on the processing the extracted plurality of HTML elements, a plurality of predictions for test case scenarios from the processed HTML elements; receiving a user selection of at least one of the plurality of predictions; and converting the at least one selected prediction into: a set of human-readable instructions comprising a test case document, or a set of machine-readable instructions comprising an automation script.

As described herein, a variety of other features and advantages can be incorporated into the technologies as desired.

The foregoing and other objects, features, and advantages of the invention will become more apparent from the following detailed description, which proceeds with reference to the accompanying figures.

DETAILED DESCRIPTION

Overview

As described herein, various techniques and solutions can be applied for providing test case predictions and automations for web pages.

In one example, a user may want to generate a set of test case documents and/or automates for an HTML web page. The web page might contain a number of HTML elements, including elements that are designed to capture user input, such as text boxes and/or other input mechanisms, such as buttons, drop-down menus, or the like.

Leveraging the structure for the web page set forth in the HTML Document Object Model (or "DOM"), the present disclosure describes computer-implemented methods and systems for generating predictions of potential test cases, such as utilizing machine learning algorithms to generate one or more predictions for test cases, and in turn, generating sets of human-readable instructions and, at least in some cases, corresponding "automates", or machine-readable instructions. In some cases, a user may be able to select, from a list of test case predictions, at least one test case for which the user wishes to generate human-readable instructions and/or machine-readable instructions. In particular cases, a user may modify a given test case prediction to add "validation points" for at least one (or multiple) step(s) in a set of human-readable instructions, which in some instances may be added to corresponding machine-readable instructions, as well. In some instances, the system may utilize user feedback to improve machine learning algorithms used in generating future test case predictions. In some particular instances, the system may permit adding one or more validation points to generated test cases, for example using either rule-based or experience-based validation. Finally, in some instances, user feedback may be received and stored to improve future predictions for test cases.

Example Method for Test Scenario Prediction and Automation

Figure 1:
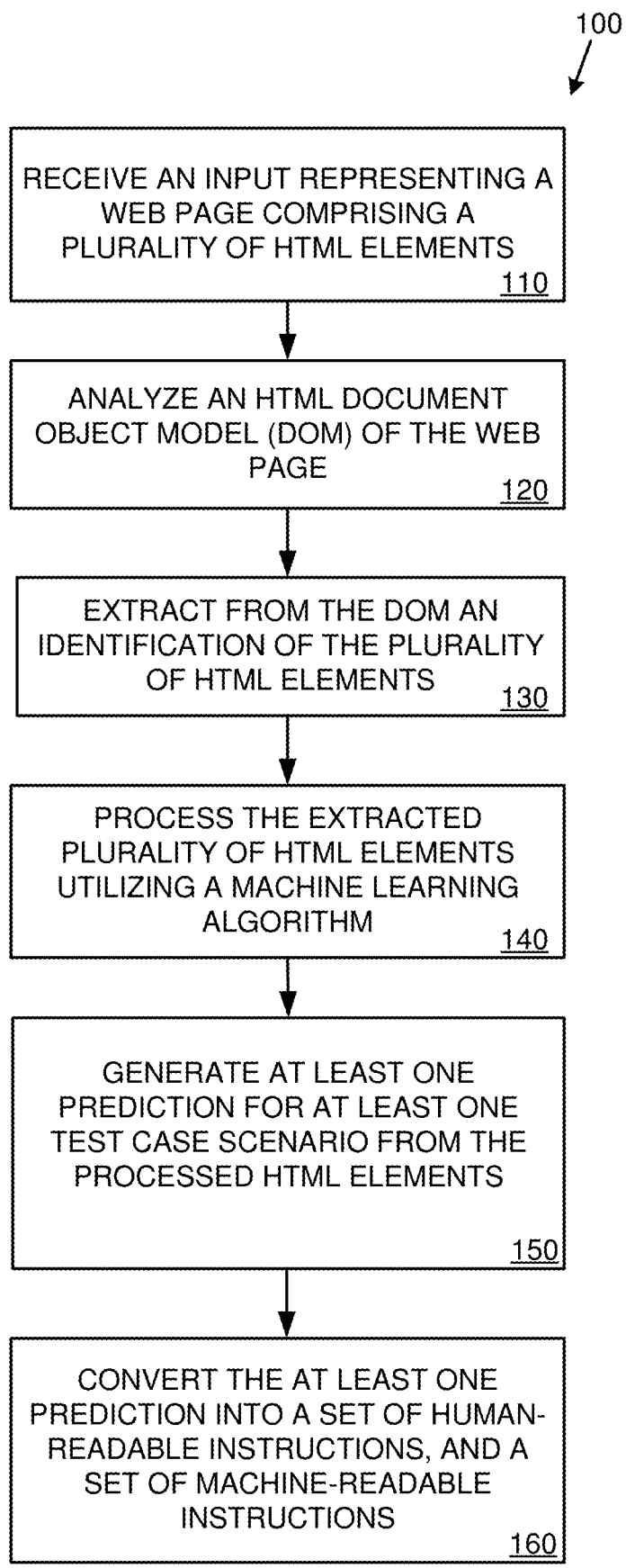
FIG. 1 is a flowchart of an example method for implementing test case prediction and generation.

FIG. 1 is a flowchart of an example method 100 for test case scenario prediction and generation. The example method 100 can be performed, at least in part, by a computing device.

At 110, an input representing a web page comprising a plurality of HTML elements is received. For example, the received input may comprise a Uniform Resource Locator (URL), an application name or file name (e.g., for a Web application, such as an SAP FIORI Application), or other identifier for an HTML-based web page.

At 120, an HTML DOM of the web page is analyzed. The Document Object Model (DOM) is a programming API for HTML and XML documents. It defines the logical structure of documents and the way a document is accessed and manipulated. HTML DOM is collection of elements in which UI elements are logically arranged and grouped.

At 130, the plurality of HTML elements is extracted from the DOM. HTML DOM is designed in such a way that user interface (UI) elements are logically arranged and grouped within container tags such as <div>, <section>, etc. A given web page may comprise a number of containers, each of which may comprise a number of HTML elements. Among these HTML elements that are grouped within the container tags for a given web page may be user interface (UI) elements, such as user-input mechanisms like buttons, fields, menus, etc., that permit users to interact with the web page, such as by providing content, input, or feedback, or selecting operations that may be performed. Within each grouping identified by a given container tag, these HTML elements may have relationships to one another, while the various containers themselves may also be related to one another. DOM scraping is a technique that permits traversing through the various layers of a web page. Utilizing this technique, the various containers within the web page can be identified, as can the relationships among the various elements within the containers, such as peer relationships and parent-child relationships. This information then can aid in determining how these various HTML elements interact. These relationships between elements within a container and between the containers themselves may be helpful in generating predictions of appropriate test cases, as further described herein.

At 140, the extracted plurality of HTML elements are processed utilizing a machine learning algorithm, such as a decision tree algorithm, Random Forest algorithm, or other appropriate machine-learning algorithm, including as further described herein.

Using these and other machine learning techniques described herein, test steps would be predicted based on the properties of and relationships between the elements present in the various containers on the web page.

In one example container, four text fields and one "Add" button may be present within a given <div> tag. The algorithm would analyze these elements and relationships between and among them to help to build out a set of potential test steps based on the content of this container. For example, the algorithm could identify that user input is required in one or more of the text fields, and/or that the "Add" button may be responsive to a user press to activate some functionality, such as adding the input of the text fields into a text file or into a table displayed on the web page. This machine learning algorithm may further build upon algorithms for parsing data, such as a decision tree, or a random forest algorithm, or other suitable algorithm, in order to parse the data and "step through" the various potential combinations of steps that are possible given the presented HTML elements, particularly the UI elements that provide mechanisms for user input.

The relationships between elements in a given container can be considered "first level relationships," inasmuch as the various elements within the container may have a direct relationship with one another. For example, the "Add" operation may not be successful until some or all of the four fields have been filled in. A test case that reverses steps 1 and 2 above, then, would not be expected to produce an interesting result, since without filling in the fields, there would be no content to save. So, not all combinations of test steps for a given set of elements in a given container will necessarily be useful. Through machine learning, and through understanding the relationships between and among the various HTML elements, test case scenario predictions can be improved, and as test cases are generated and automated, user feedback may also be received to improve future predictions, as further described herein.

The number of scenario predictions will typically be a function of the complexity of a given web page. A web page with multiple containers, each having multiple HTML elements, particularly elements that have different relationships with one another, would be expected to generate more predicted test case scenarios than a page with only a single container with a single button, for example.

Continuing the above example, the machine learning algorithm may continue to analyze any additional containers present on the web page in order to facilitate predicting additional test steps for the elements at each container level present in the HTML DOM. Additionally, the algorithm may look at "second-level" relationships between and among various containers on a web page until each of the containers on the web page has been identified and any potential test steps identified. Once this process has been completed, predictions for potential test case scenarios can be generated based on these determined test steps and relationships.

At 150, at least one prediction for at least one test case scenario is generated from the processed HTML elements. This prediction may provide an intermediate representation of the various predicted test cases, using, e.g., a "keyword" or brief instructions, such as "add", "save", "delete", or "modify". Predicted test scenarios could be generated in an intermediate form, which may contain keywords for each of a number of potential test scenarios that may be used by the machine learning algorithm to generate test case predictions, such as:

Click|Button|Add

In turn, these intermediate predictions may be shown in a user interface or webpage as illustrated, e.g., in FIG. 6, further discussed below, e.g., by providing a list of keywords, each associated with a different test case to be performed. These instructions, in turn, can be processed into both a set of human-readable instructions (which may be generated as a document, e.g., in word or PDF format), as well as machine-readable instructions, as further discussed. In some instances, this could be in response to a user selecting at least one scenario for which she wants to generate a test case document and/or a test automate. In some instances, multiple predictions may be generated.

In particular instances, the one or more predictions may comprise validation steps, which may be added to the one or more predictions, if required, using rule-based validation and/or experience-based validation, as further described herein. These validation steps, in turn, can be converted into human-readable instructions and/or machine-readable instructions, as further described herein.

At 160, the at least one prediction is converted into a set of human-readable instructions and a set of machine-readable instructions.

Using machine learning, such as a natural language processing algorithm or other suitable machine learning algorithm, an intermediate test case prediction containing a number of keywords can be converted to a complete sentence. So, for example, a prediction having the following combination of keywords: "Click|button|Add" may be converted to the human-readable instruction "Click the Add button." For the above example, then, the method might generate a test case document comprising test steps: 1) "Fill in four text fields" and 2) "Click the Add button."

In the case of one or more validation steps included among the one or more predictions, these steps may correspond to actions that may be performed by a user to perform validation manually, e.g., by following instructions in a test case document. In such instances, a user may determine whether a validation step is successful or not based, e.g., on comparing a result yielded in response to a given action, versus the result predicted using rule-based validation and/or experience-based validation.

Additionally, the at least one prediction can be converted, again using natural language processing or another suitable machine learning algorithm, into machine-readable instructions that can be used for test case automation. Based on these keywords, test script code can be generated to automatically perform each step of the test, with the complete set of instructions forming a test automate, or automation script.

For example, using machine learning, the steps of a given test case could be converted from human-understandable language into a machine-readable format. Some examples include XML format or JSON, though any suitable machine-readable language may be used. In turn, these instructions may be provided as input to a test automation tool, such as HP QTP, which can then import, e.g., machine readable XML instructions into a test script automate, or automation script. Other similar tools may be used to convert XML or other machine-readable language into automation scripts, as well. Some examples include Selenium, TestComplete, Watir, or other tools as known to one of skill in the art for generation of automation scripts.

This automation script can then be utilized to automatically test the functionality for the web page specified in a given test case. This is different from the manual process for testing a page employed, e.g., by a user following the steps in a test case document.

In some instances, the machine-readable instructions may be used to determine whether a given validation step predicted using rule-based validation and/or experience-based validation. is successful based on the result yielded, e.g., after running the script. A validation result may be automatically generated by the machine, e.g., by comparing, the result yielded by running an automation script to a predicted or expected result based on, e.g., rule-based validation and/or experience-based validation. In particular, the at least one predicted validation step be used to test at least one function of the web page, and to generate a validation result indicating whether the at least one function of the web page is functioning properly.

In some instances, multiple such validation steps may be performed. In particular instances, a document (e.g., a word document, a PDF, or other suitable reporting document)

and/or a display (e.g., a display window in a user interface or other suitable display) may be generated to report on the outcome of the one or more validation steps. In some instances, this report or document indicates one or more functions that are functioning properly and/or one or more functions that are not functioning properly. For one or more functions that are not functioning properly, the report may indicate a particular error or a list of possible errors associated with the failure of test validation for the one or more functions. One or more of these errors may be generated based on prior results from performing similar validation steps, which results may be saved, e.g., in a feedback repository, as further described herein.

Example Environment for Test Case Prediction and Automation

Figure 2:
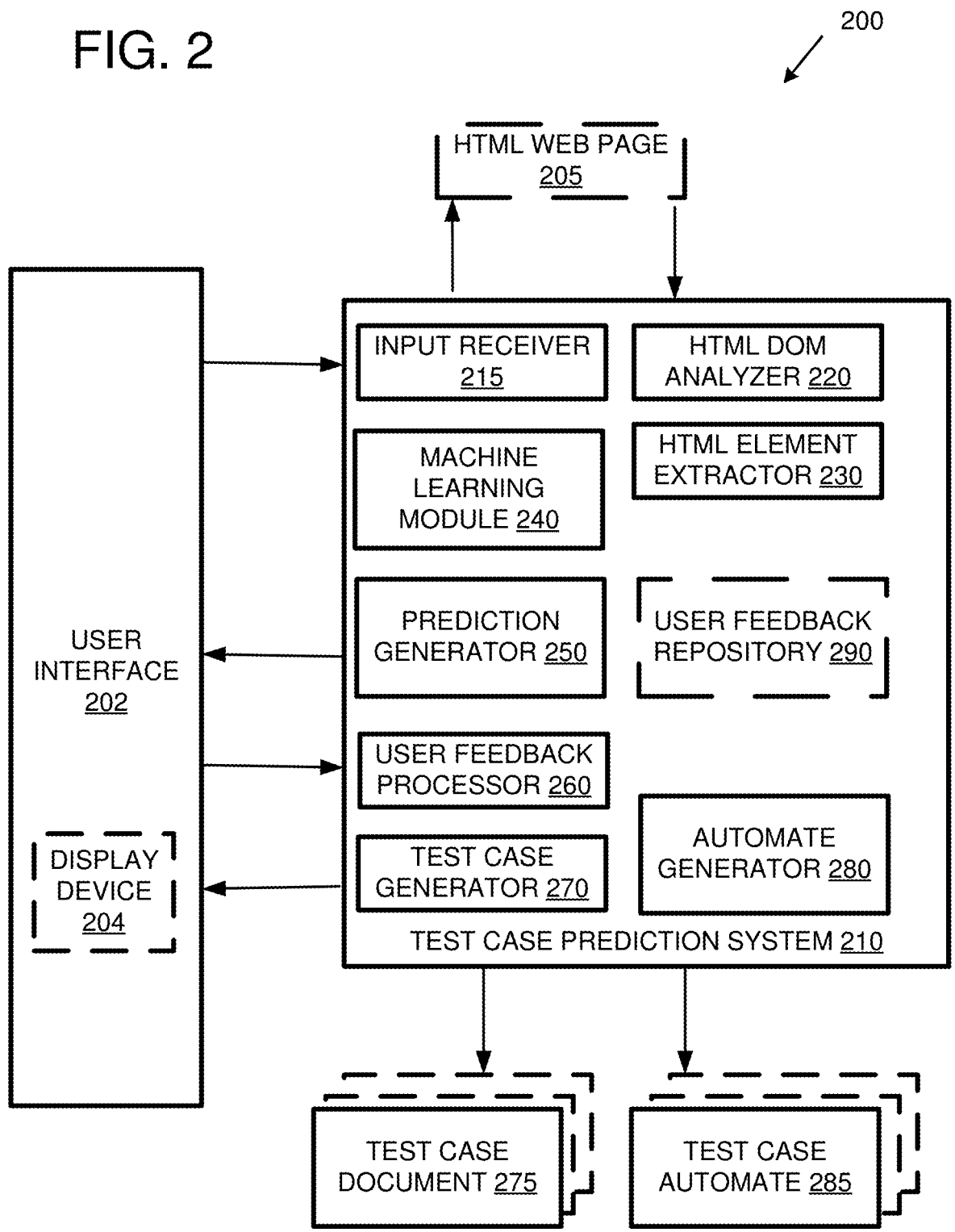
FIG. 2 is a diagram depicting an example environment for implementing test case prediction and generation.

FIG. 2 is a block diagram of an example environment 200 implementing test case prediction and automation. The environment comprises a user interface 202 for receiving user input, an HTML web page 205, a test case prediction system 210, which may in turn generate test case document 275 and test case automate 285, as further described herein.

User interface 202 may be configured to receive user input, such as user input specifying an HTML web page 205 for which a user wishes to predict and generate test cases, and may further comprise a display device 204.

Test case prediction system 210 is not intended to suggest any limitation as to scope of use or functionality, as the technologies may be implemented in diverse general-purpose or special-purpose computing systems. The system can include, e.g., computing devices (e.g., server computers, desktop computers, database systems, and/or other types of computing devices) and/or software resources supporting the prediction of test case scenarios for an HTML web page.

Test case prediction system 210 may comprise: an input receiver 215, which may be configured to receive user input, including user input specifying an HTML web page to test. HTML DOM analyzer 220 may be configured to receive the HTML DOM for HTML web page 205 and to analyze it as described herein to identify one or more HTML elements contained therein. HTML element extractor 230 may be configured to extract the one or more identified HTML elements in the DOM. Machine learning module 240 may be configured to parse the identified HTML elements using a machine learning algorithm, the results of which may be passed to a prediction generator 250 to generate one or more test case predictions, which may in turn be provided to a user via the user interface 202. User feedback processor 260 may be configured to receive user feedback, which may include a user selection of at least one of the generated test case predictions for generation as at least one corresponding test case document 275 and/or test case automate 285. Test case generator 270 may be configured to receive the selection of the at least one generated test case prediction and to generate the test case document 275. Automate generator 280 may be configured to receive the selection of the at least one generated test case prediction and to generate the test case automate 285. Optionally, a user feedback repository 290 may be provided, and may be configured to receive and store user feedback, such as from user feedback processor 260, and in some embodiments, may be configured to provide it to the machine learning module, such as for use in generating future test case predictions. Additional details regarding these functions performed by test case prediction system 210 are provided herein.

Example Web Page for Test Case Prediction and Automation

Figure 3:
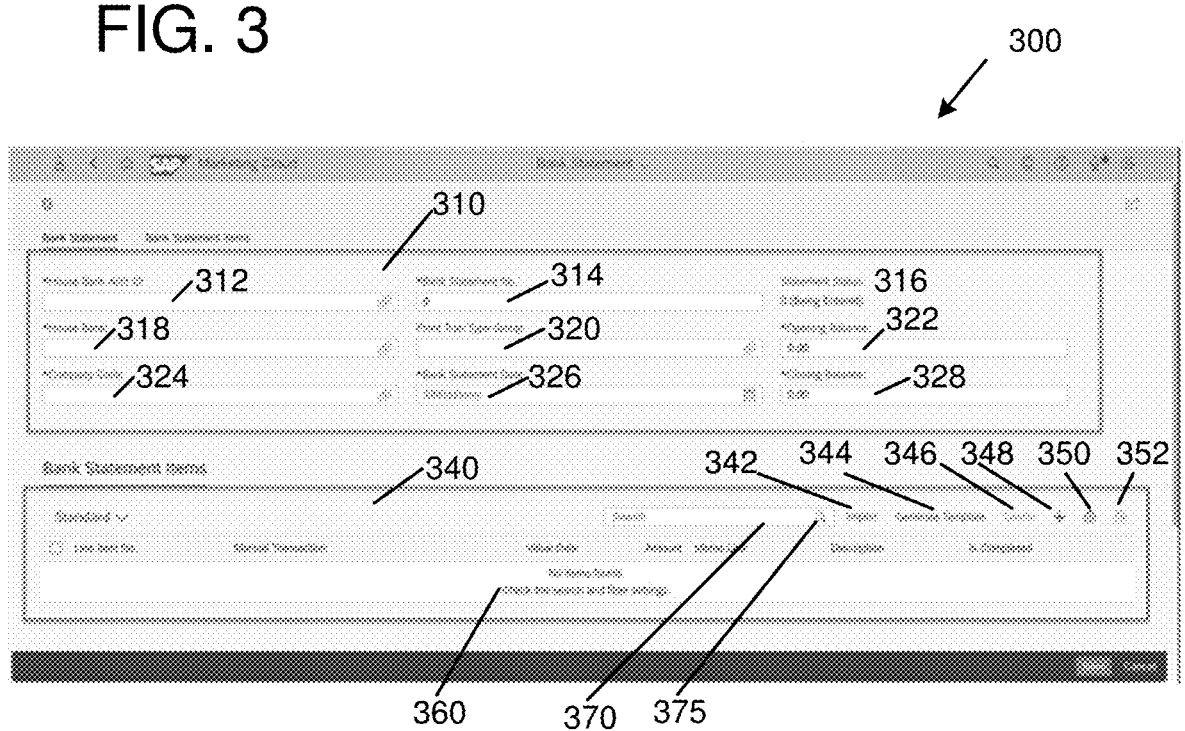
FIG. 3 is an example of a web page that may be used in conjunction with the technologies described herein.

FIG. 3 is an example web page 300 with which the technologies described herein may be utilized to generate one or more of: predictions for test case scenarios, test case documents, and/or test case automates. In the illustrated example, web page 300 has two containers, which may be referred to in some cases as "Facets", a first facet 310, which contains a number of user-fillable fields, and a second facet 340, which includes a table structure 360 and a number of mechanisms for user entry, including buttons and a fillable search field 370.

As discussed above, the first facet has nine potential user-fillable fields, which are as follows:
House Bank Acct ID—312
Bank Statement No. —314
Statement Status—316
House Bank—318
Pmnt Tran Type Group—320
Opening Balance—322
Company Code—324
Bank Statement Date—326
Closing Balance—328

It should be noted that certain of these fields may involve required input, and may include an identifier indicating the same, such as a star or other identifier, while other fields may be optional, or may even be "non-fillable" fields where the values are provided outside of any action with the user, or may not be modified by the user. For example, note that Statement Status 316 does not have a user entry box presently available to accept a user entry.

In the second facet 340, there is a table structure 360 present, though in the illustrated example, the table currently has no data, as illustrated by the message "No Items found."

Also presented is a search entry box having fillable search field 370 and a search button 375.

Additionally, there are a number of buttons presented to invoke various functions responsive to user input actions, which are as follows:
Import—342
Generate Template—344
Delete—346
Add (indicated by a plus sign) —348
Settings (indicated by a settings icon) —350
Export (indicated by an export symbol) —352

FIG. 3 also illustrates one aspect addressed by this disclosure, namely that certain user actions are only permissible in certain scenarios. So, for example, the Delete button 346 and the Export button 352 are grayed out in the illustrated embodiment. This is so because, as noted above, no entries have yet been made into the table 360, so there are no records to delete or export. So, the potential scenarios for a given web page will change, depending on what actions a user takes. Once a user either adds a record, such as using the Add button 348 or imports one or more records, such as using the Import button 342, the "grayed out" options that were not available for activation by the user, Delete button 346 and Export button 352, might become available, as there would now be records on which they could operate.

Example Developer Tool Illustrating HTML DOM Scraping Functionality

Figure 4:
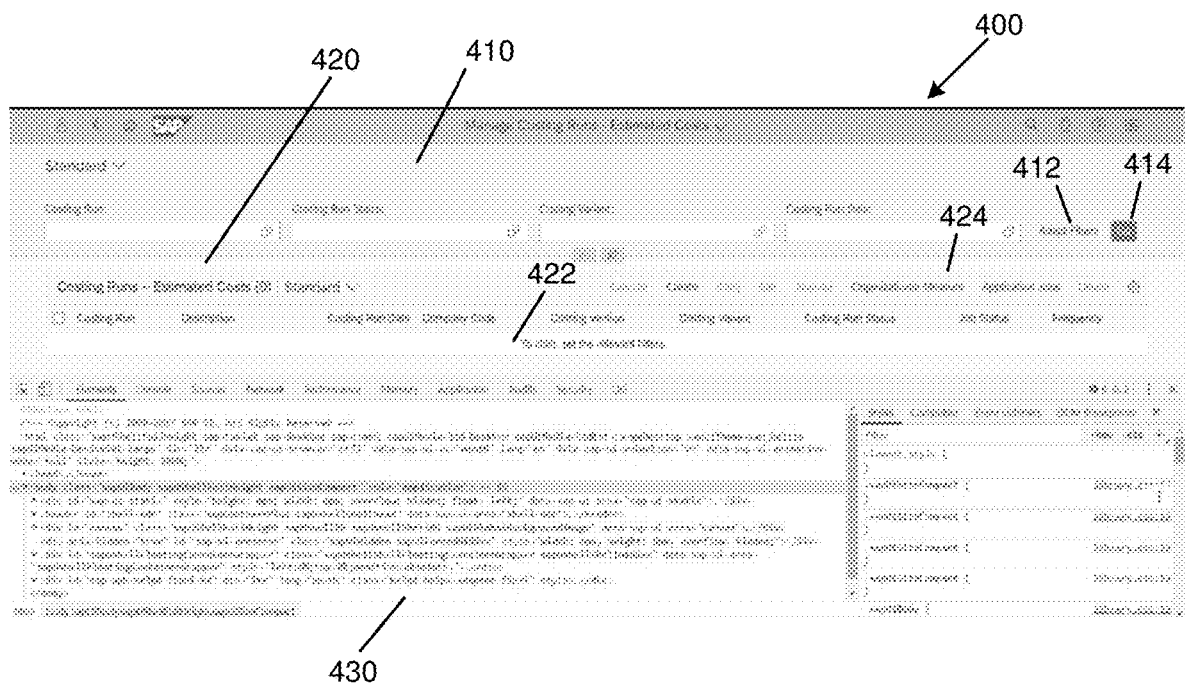
FIG. 4 is an example of a developer tool that may be used to identify elements within the HTML DOM for a web page.

FIG. 4 illustrates an exemplary developer tool 400 that can be used to present the underlying HTML for a web page being viewed, including, e.g., the HTML DOM for the web page. The presented web page in this example, similar to web page 300 illustrated above, contains a first container 410 and a second container 420.

First container 410 contains not only user-fillable fields, e.g., "Costing Run:" and "Costing Variant", but additional buttons for performing various actions, such as "Adapt Filters" button 412 and "Go" button 414.

Second container 420 is similar to the second facet 340 in the previous example described above, in that it contains a table structure 422, as well as a user input area 424 containing a number of user-clickable buttons. And, as with the example above, in the illustrated example certain of the buttons are grayed out, as the table structure 422 is devoid of content on which these buttons would otherwise operate. For example, the "Create" buttons is currently clickable, while, e.g., the "Copy" button is grayed out, since there is no current content to copy. Included within the table structure 422 is a prompt to the user: "To start, set the relevant filters."

HTML window 430 is a window for the developer tool which allows a user to view the various elements of the web page. Via this tool, the user is able to visualize the various containers and associated tags, as well as the HTML elements, including user interface elements, contained within each of the containers, as well as their associated relationships, e.g., parent-child and sibling relationships among various HTML elements in a given container.

This information, which is visually presented to the user in this exemplary embodiment, can also be harvested using DOM scraping techniques, and leveraged by the machine learning algorithms described herein, to extract the various HTML elements contained within the page, as well as information regarding their relationship to one another, to generate test case predictions. So for example, information would typically be provided in the DOM showing that first container 410 contains four user-fillable fields, and buttons 412 and 414 to operate on these fields. Using machine learning to interpret this raw data extracted from the DOM allows the system to generate test case predictions for the various operations that may be performed within a given container, which—together with the available actions in the other contains, such as container 420—may be used to generate one or more intermediate test scenario predictions for at least a portion of the web page, or in some instances, for the entire web page.

Example Intermediate Representation Table of Web Page

Figure 5:
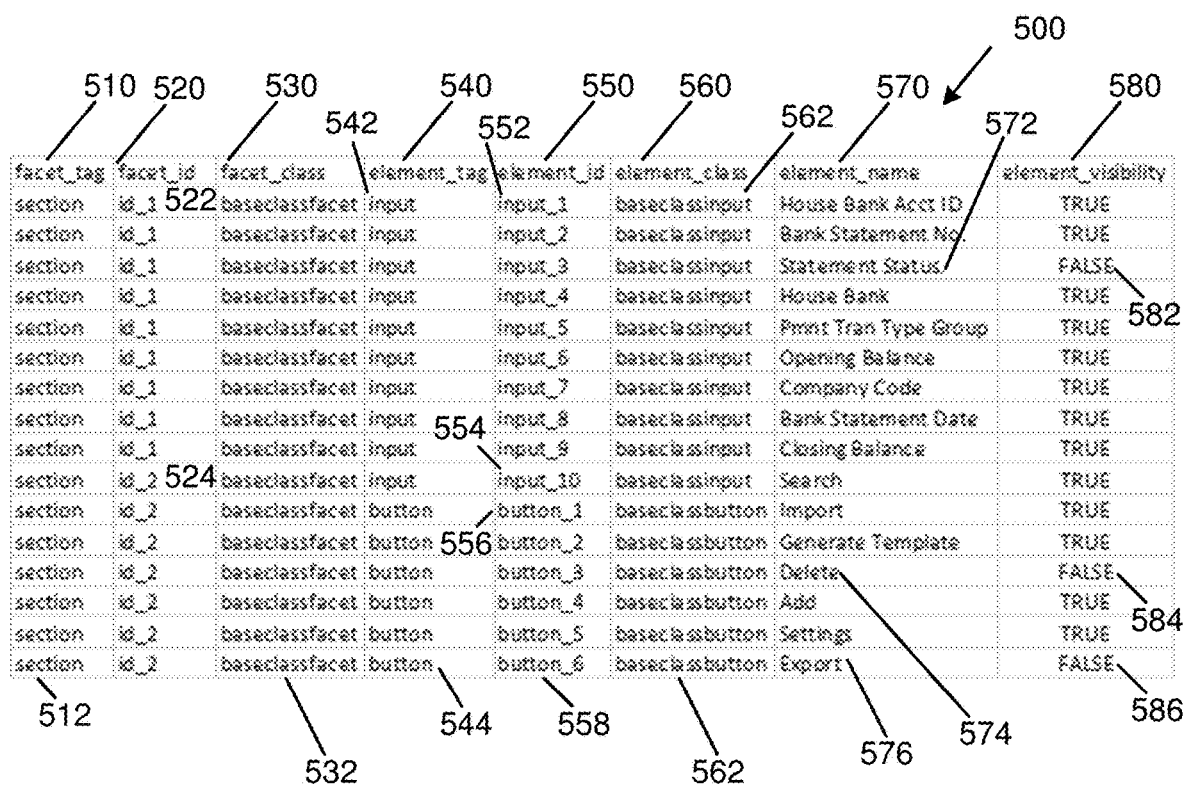
FIG. 5 is an example of an intermediate representation of the HTML elements in the example web page of FIG. 3.

FIG. 5 illustrates an example of an intermediate representation (IR) table 500 of the HTML elements in the example web page 300 of FIG. 3. This representation may be generated in response to scraping the DOM for web page 300 at a given point in time, and may be used by the machine learning algorithm to generate the test case predictions, as further described herein. In the illustrated embodiment, the IR 500 is presented in the form of an Excel spreadsheet, generated using a predetermined .csv format, though other formats be used. The illustrated IR contains a number of columns, including:

facet_tag 510
facet_id 520
facet_class 530
element_tag 540
element_id 550
element_class 560
element_name 570
element_visibility 580

The first column, facet_tag 510, contains the tag for the specific container within the web page, in this case the tag section 512 indicates a section of the web page.

The second column, facet_id 520, contains the tag identifying the specific number of the container represented in the first column. For example, there are two sections in the current web page, represent by id_1 522 and id_2 524.

The third column, facet_class 530, contains the class by which the container is identified, in this case baseclassfacet 532.

The fourth column, element_tag 540 indicates the type of element being represented, in this case including element tags input 542 and button 544.

The fifth column, element_id 550 contains the tag identifying the specific number of the element represented in the fourth column. For example, there are ten inputs in the current web page, represent by identifiers input_1 552 through input_10 554 and six buttons, represented by button_1 556 through button_6 558.

The fifth column, element_class 560 contains the class by which the element is identified, in this case baseclassinput 562 for the input elements and baseclassbutton 564 for the button elements.

The sixth column, element_name 570 contains the specific names for the various HTML elements within each container, e.g., Statement Status. 572, Delete 574 and Export 576.

The seventh column, element_visibility 580 contains an indication of whether the various elements are visible at the time of the snapshot. So, for example, as discussed above, since Statement Status is not a field that is currently available for user input, its visibility status 582 is listed as false. It is to be understood that these tags and identifiers are only exemplary, and that different identifiers, more or fewer columns, more or fewer tags, and more or fewer identifiers could be used.

Similarly, table structure 360 can also be identified using a table tag which is present in the HTML, so when the table tag is present in the HTML, the contents of the table can be interpreted, and in the current case, since they are empty, when this system sees this, there are certain allowable functions and certain functions that are not possible. So, because the table structure 360 in web page 300 currently contains no entries, the delete button 346 and export button 352 are grayed out, as shown in FIG. 3, and so their respective visibility statuses 584 and 586, are set to false. The other buttons, i.e., search, import, generate template, add, and settings, do not require content within table structure 360 in order to be invoked, so for each of these buttons, the visibility status is set to true.

Based on this intermediate representation, machine learning can be applied to determine what actions are available at a given point in time to be tested, so that predictions can be generated regarding potential test case scenarios.

So, for each of these potential test case scenarios, a first step might be to fill out the fields contained in the first container, while the second step would depend on the available options in the second container. So, for example, test case predictions might be generated for an "Add" case, an "Import" case, etc.

Additionally, in the above example, once add or import steps are actually performed, additional functionality becomes available. This, in turn, generates additional potential test case scenarios to test. So, while "Add" might be a first test case scenario, a "Delete" test case scenario becomes available once a record has been added to table structure 360, e.g., using Add or Import functions.

So in the particular example, there might be three test case scenario predictions generated, which might be referred to, for example as:

Test Scenario Prediction 1: Add
Test Scenario Prediction 2: Import
Test Scenario Prediction 3: Delete.

It is to be understood that additional test case scenarios could be generated based on the other UI elements present in web page 300, but these are presented for purposes of illustration.

Example User Interface for Presenting Test Case Scenario Predictions

Figure 6:
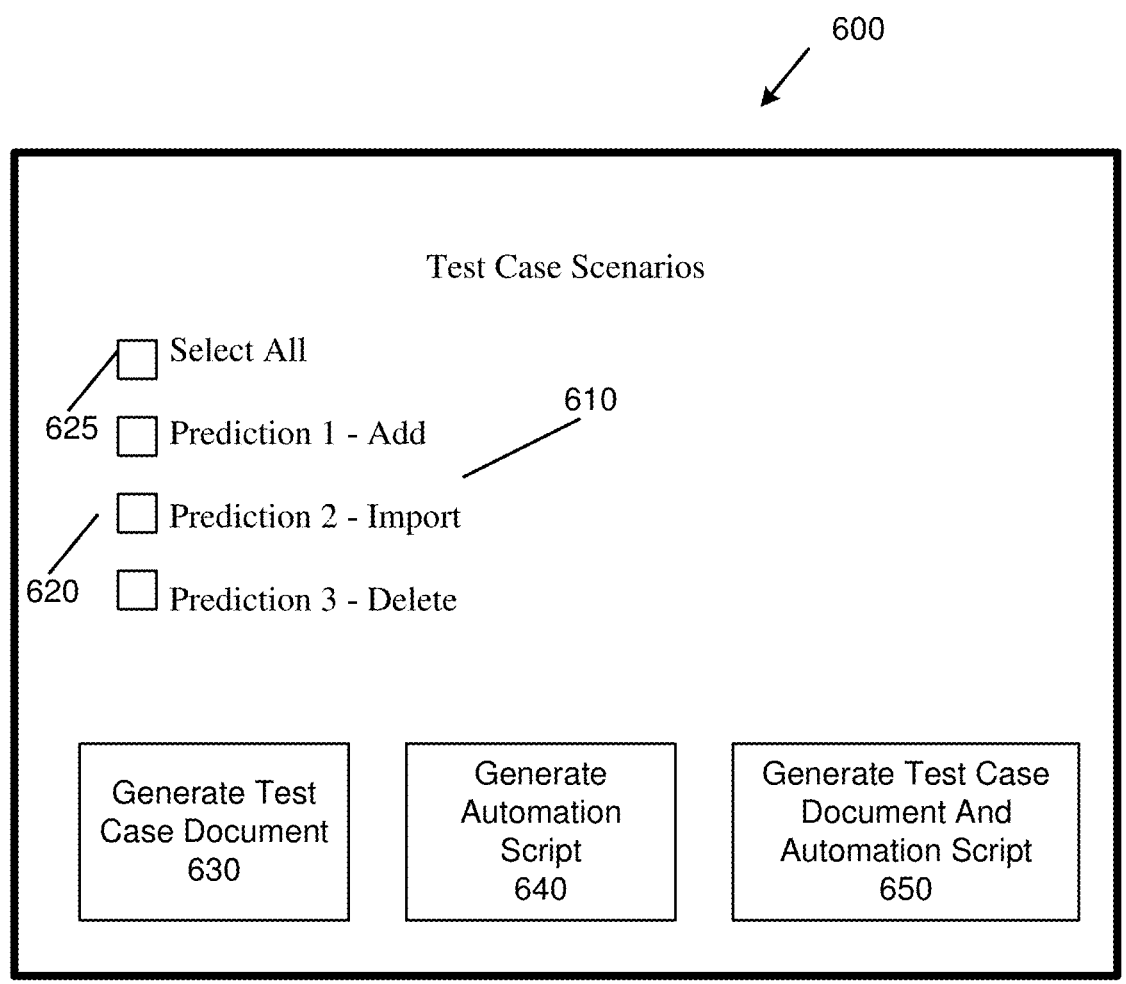
FIG. 6 is an example of a user interface for presenting a list of test scenario predictions that may be used in conjunction with the technologies described herein.

FIG. 6 illustrates an exemplary user interface 600 for presenting test scenario predictions, e.g., based on the intermediate representation table shown in FIG. 5. In the illustrated example, the user is presented with a list 610 of three keywords representing various test cases predictions generated in response to applying the machine learning algorithm to the extracted HTML DOM elements. These predictions can be selected and in turn can be leveraged as input to generate test case documents and/or test case automation scripts, as further described herein.

In the illustrated embodiment, each the three predicted scenarios described above is presented in list 610, along with respective checkboxes 620, allowing a user to designate at least one scenario (or multiple scenarios) for which the user wishes to generate associated test case(s), automation script (s), or both. In the illustrated embodiment, a "select all" checkbox 625 is also provided, which may allow a user to select all of the predictions for generation of a test case document or automation script.

Provided below the list 610 are buttons allowing a user to "Generate Test Case Document" 630, "Generate Automation Script" 640, or "Generate Test Case Document And Automation Script" 650.

Depending on her selections, then, a user may be presented with one or more test case documents, either visually within the interface, in a separate file, or through other methods. Similarly, the user may be provided with one or more automation scripts, which can either be provided to the user for later automation, or optionally, a facility may be provided which permits the user to run the scripts in real-time. In this manner, a user may be permitted to select one or all test cases for generation with a single action, and also with a single action, decide whether to generate a test case document and/or an automation script for these selected cases.

It is to be understood that different or additional options may be provided to the user, as well. It is also to be understood that this is merely an example of an exemplary user interface that may be used with the techniques and systems described herein, and that test cases could be generated without requiring further user input, such as when only a single prediction is generated, and/or may otherwise be selected for generation without relying on a user selection, or may be selected using a different type of user interface structure, such as, a drop down menu, a series of selectable icons, or other input mechanism, such as using voice input, or other suitable input mechanism.

In some embodiments, the input of a given web page URL may be provided to, e.g., a chat bot window, which can then leverage machine learning algorithms as described herein to provide suggestions or predictions on possible test scenarios. Alternatively, these could be displayed in, e.g., a web application, a standalone desktop application, a Rest API endpoint, or other suitable mechanism for presenting a user interface.

Example Test Case Predictions

For each of the above predictions, there are a series of steps that may be taken in order to determine the steps necessary for the associated test case document that will ultimately be generated for the prediction. A further discussion of the three predictions discussed above, and the steps in their associated test cases, is provided below.

As discussed, the machine learning algorithm may "step through" the HTML DOM elements extracted from the web page and determine what steps are available at a given point. So, in the above example, while there is really only one possible test step (or set of test steps) in the first container, namely filling in the fields contained there, in the second container, there are a number of different possibilities for test steps, and only certain steps are available at certain times, ad described above. Additionally, certain test steps may be mandatory for a given test scenario, while others may be optional. For example, as part of a test of "Add" functionality, "adjust settings" may be an optional step, as shown below. Meanwhile, for a test of the "Delete" functionality, it may first be required to either Add or Import data into the table structure. So, while one of these steps is required, it is optional which of them is performed. How the test cases themselves are generated, then, may be based on the alternatives available at a given point, which may be determined, for example, using a decision tree algorithm or other suitable machine learning algorithm that can be applied, e.g., to the raw HTML data extracted from the web page being analyzed.

Following are example test cases for the various predictions set forth above:

Test Case Prediction 1

For the first container, the below text boxes are present.
House Bank Acct ID
Bank Statement No.
Statement Status.
House Bank
Pmnt Tran Type Group
Opening Balance
Company Code
Bank Statement Date
Closing Balance
So, a prediction for this container might be
1. Fill in the text boxes.
For the second container, there is table structure present, along with buttons as set forth below.
Import
Generate Template
Delete
Add
Settings
Export
Among these buttons, Delete and Export may not be visible if the table structure is currently empty.
So, a prediction based on this container might be:
2. Click on Settings and Adjust the columns.
(This may be recognized as being and/or indicated to be an "<Optional Step>".)

3. Click on Add button and Fill in the input fields for the new row.
A final step could be predicted as
4. Click on Save button.
For this final step, an alternate step could be presented, e.g., as:
Alternative Step: Click on Cancel button.

Test Case Prediction 2

For the first container, the prediction could be similar to Prediction 1:
1. Fill in the text boxes.
For the second container, a second prediction may be generated, as follows:
2. Click on Settings and Adjust the columns. <Optional Step>
3. Click on Import button and attach a file.
Again, a final step could be predicted as
4. Click on Save button.
For this final step, again, an alternate step could be presented, e.g., as:
Alternative Step: Click on Cancel button.

Test Case Prediction 3

For the first container, the prediction could be similar to Prediction 1:
1. Fill in the text boxes.
For the second container, a third prediction may be generated, such as by leveraging one of the previously tested user actions—e.g., adding input to the container—that makes additional test steps possible, as follows:
Initially, Delete and Export are not visible, as described above. However, it is possible to test the delete functionality by first completing a step, such as Add.
So, one exemplary prediction for a Delete test case scenario would be as below.
2. Click on Settings and Adjust the columns. <Optional Step>
3. Click on Add button and Fill in the input fields for the new row.
4. Select the newly added record in the table, Click on delete.
A final step could be predicted as
5. Click on Save button.
For this final step, an alternate step could be presented, e.g., as:
Alternative Step: Click on Cancel button.
It is to be understood that the system may continue generating additional test case predictions, either based on alternative tests or on additional steps, such as until test case predictions have been generated for each of the potential combinations of user inputs available for the given web page. Once these predictions are generated, they can be converted into test case documents, whether automatically, or in response to receiving, e.g., a user selection in a user interface to select a given prediction for generating a test case document.
Additionally, user input to select between or among these test cases may be leveraged by the machine learning algorithm to prioritize certain test case predictions above others, or to eliminate certain scenarios that have been previously presented a given number of times but have not been previously selected for generation, such as over a specific time period.

Example Test Case Document

Figure 7:
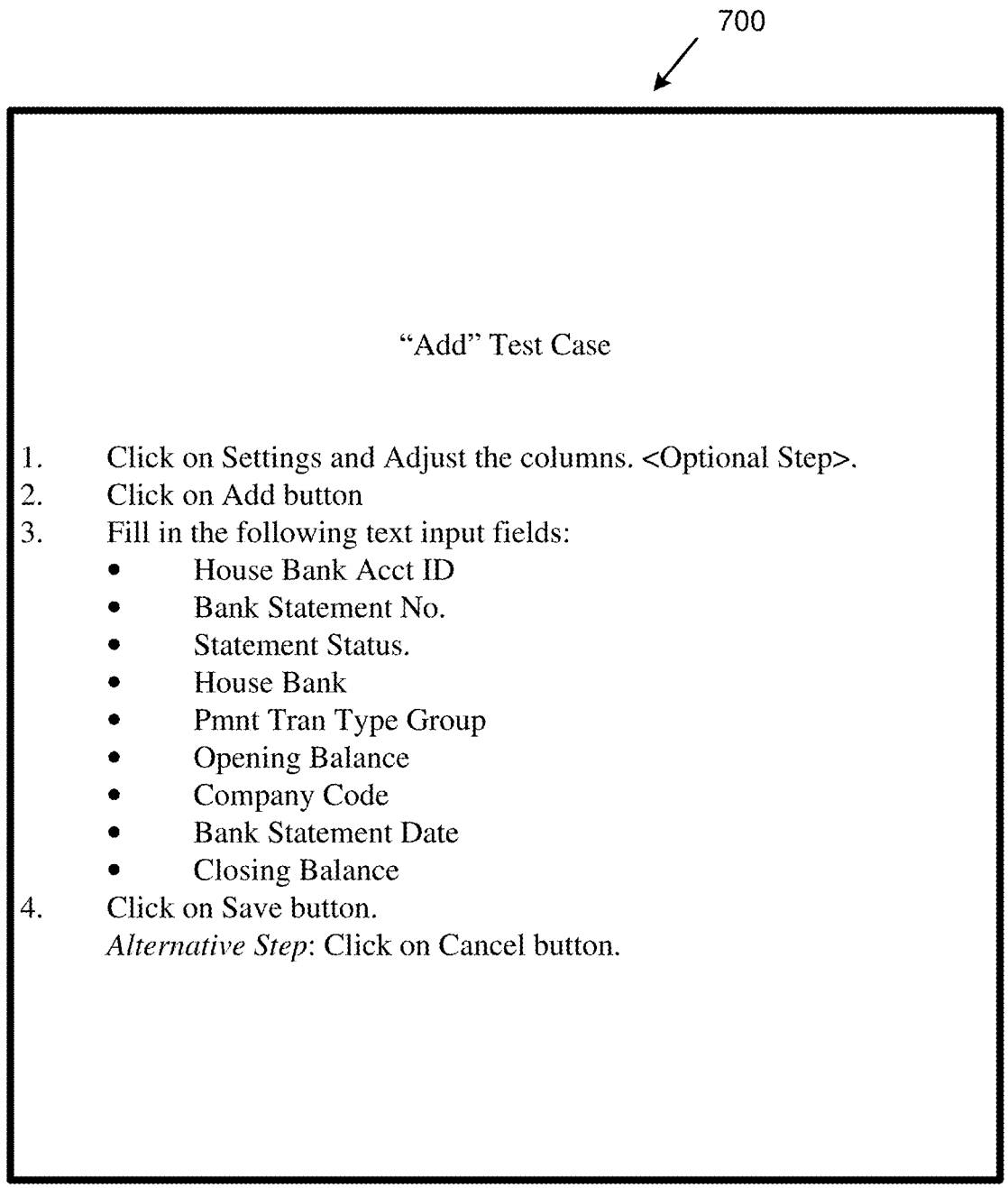
FIG. 7 is an example of a test case document that may be generated using the technologies described herein.

FIG. 7 illustrates an example test case document 700 that may be generated using the techniques and systems described herein. In the illustrated example, steps similar to those from Prediction 1, above, are incorporated into a single document, which may be generated and presented to the user, e.g., via a user interface, or may be exported to a file, such as a text document, a Portable Document Format (PDF), or other suitable document. More or less test steps, including validation steps, may be included in a test case document, as further described herein. These test case documents, in turn, can be saved by the user, printed, and/or sent to another user for execution.

Example Method for Adding Validation Point to a Test Scenario Prediction

Figure 8:
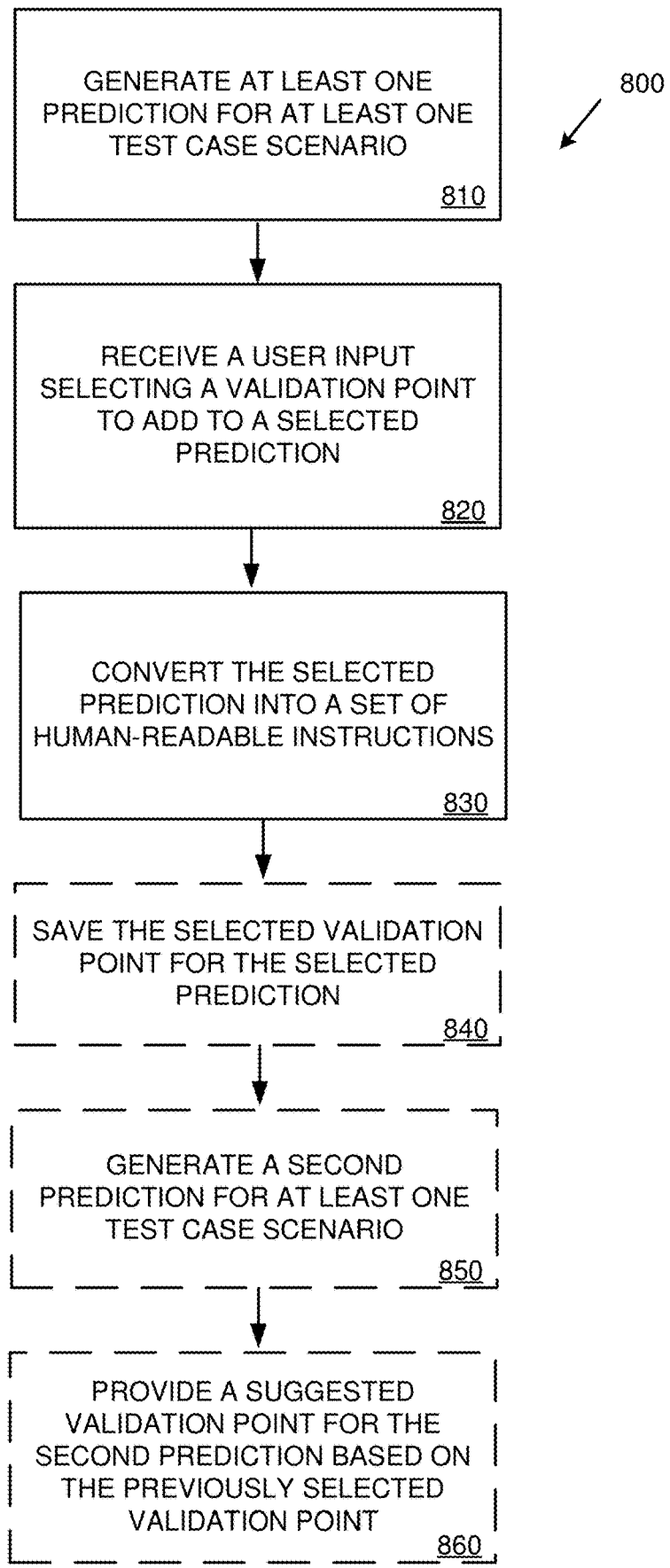
FIG. 8 is a flowchart of another example method for implementing test case prediction and generation.

FIG. 8 is a flowchart of an example method 800 for adding a validation point to a test case scenario prediction. The example method 800 can be performed, at least in part, by a computing device.
At 810, at least one prediction for at least one test case scenario is generated, such as according to the methods and techniques described herein.
At 820, user input is received selecting a validation point to add to a selected prediction from among the at least one prediction(s).
At 830, the selected prediction is converted into a set of human-readable instructions and a set of machine-readable instructions.
In an optional step, at 840, the selected validation point for the selected prediction is saved.
In another optional step, at 850, a second prediction is generated for at least one test case scenario.
In another optional step, at 860, a suggested validation point is provided for the second prediction based at least in part on the previously selected validation point.

Example Validation Techniques

In addition to providing the ability for users to generate predictions for test cases, and corresponding test case documents and automation scripts, techniques are described herein for adding validation points to the generated test cases, so that expected output can be compared to actual output.
In one example, rule-based validation can be used to set validation points based on the actions to be performed for the test steps. For example:
When a "Save" button is pressed, which may mean that the user is trying to save a new object or update an existing object with recently entered changes, a validation point may be added to determine:
  i) whether the object is actually saved or not (such as by checking for an ID generated by the save operation, or else in the case of a test failure, fetching fetch the system response, for example a system error message or warning message.
  ii) If the object is saved (step (i)), determining whether the input filled in the text boxes has actually been retained within the appropriate text boxes in response to the save operation.
When a "Go" button is pressed, e.g., on a search operation, which may mean that the user is searching for something, the result of this operation should be validated based on the filter criteria set. In other words, did the user receive the expected type of search results based on one or more selected criteria. Again, in the case of failure, particularly if search results are not generated, try to fetch the system response, for example a system error message or warning message.

These validation steps may be added to the predicted test cases and provided within a user interface to allow the user to interact with the test case scenario predictions in a meaningful way, so that the scenarios can be tailored to ensure that not only are the test steps correct, but the actual outcome of performing the test can be compared to what would be the expected outcome for the test steps performed. These validation points, once selected and/or approved by the user, can then in turn be saved within the test case document and/or any associated automation script. Additionally, the user may be prompted to add his or her own validation steps to a given test case, and these steps, too, can be and/or saved within the test case document and/or any associated automation script, In a further example, experience-based validation may allow a system using the techniques described herein to learn continuously based on previously selected and/or previously added validation points received from a user in order to start predicting validation points for future test case scenarios. This feedback may be saved, for example, in a user feedback repository, such as user feedback repository 290, and then leveraged by, e.g., a machine learning module such as machine learning module 240 or prediction generator, e.g., prediction generator 250 in generating future predictions. In so doing, the systems and methods described herein may utilize machine learning techniques and user feedback on past predictions to ensure that the system gradually becomes smarter day by day in generating predictions that are helpful to the user.

Example Computing Systems

Figure 9:
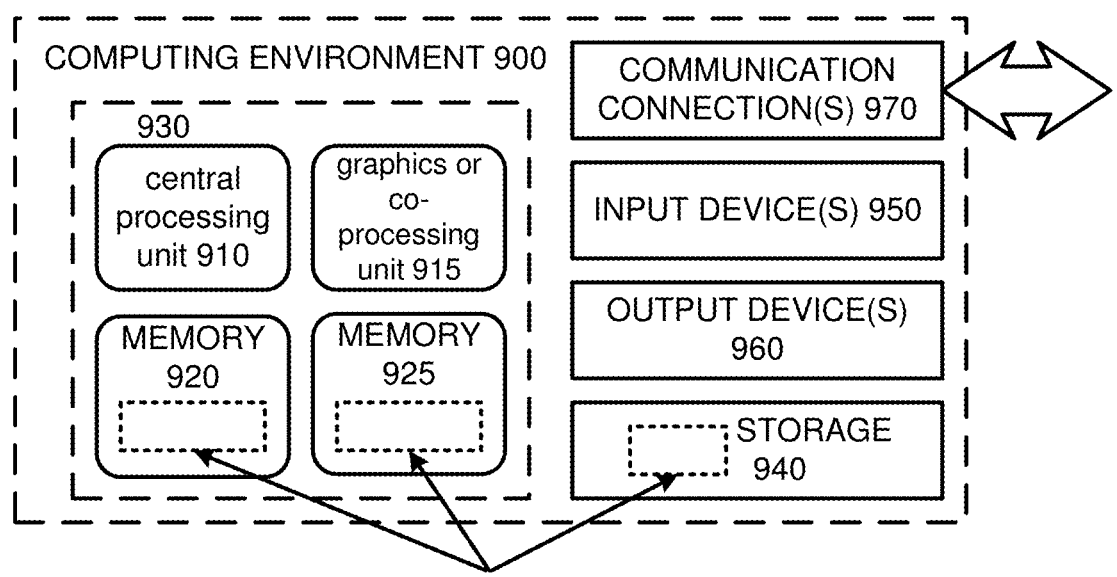
FIG. 9 is a diagram of an example computing system in which some described embodiments can be implemented.

FIG. 9 depicts a generalized example of a suitable computing system 900 in which the described technologies may be implemented. The computing system 900 is not intended to suggest any limitation as to scope of use or functionality, as the technologies may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), nonvolatile memory (e.g., ROM, EEPROM, flash memory, etc.), or some combination of the two, accessible by the processing unit(s). The memory 920, 925 stores software 980 implementing one or more technologies described herein, in the form of computer-executable instructions suitable for execution by the processing unit(s).

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more technologies described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Cloud-Supported Environment

Figure 10:
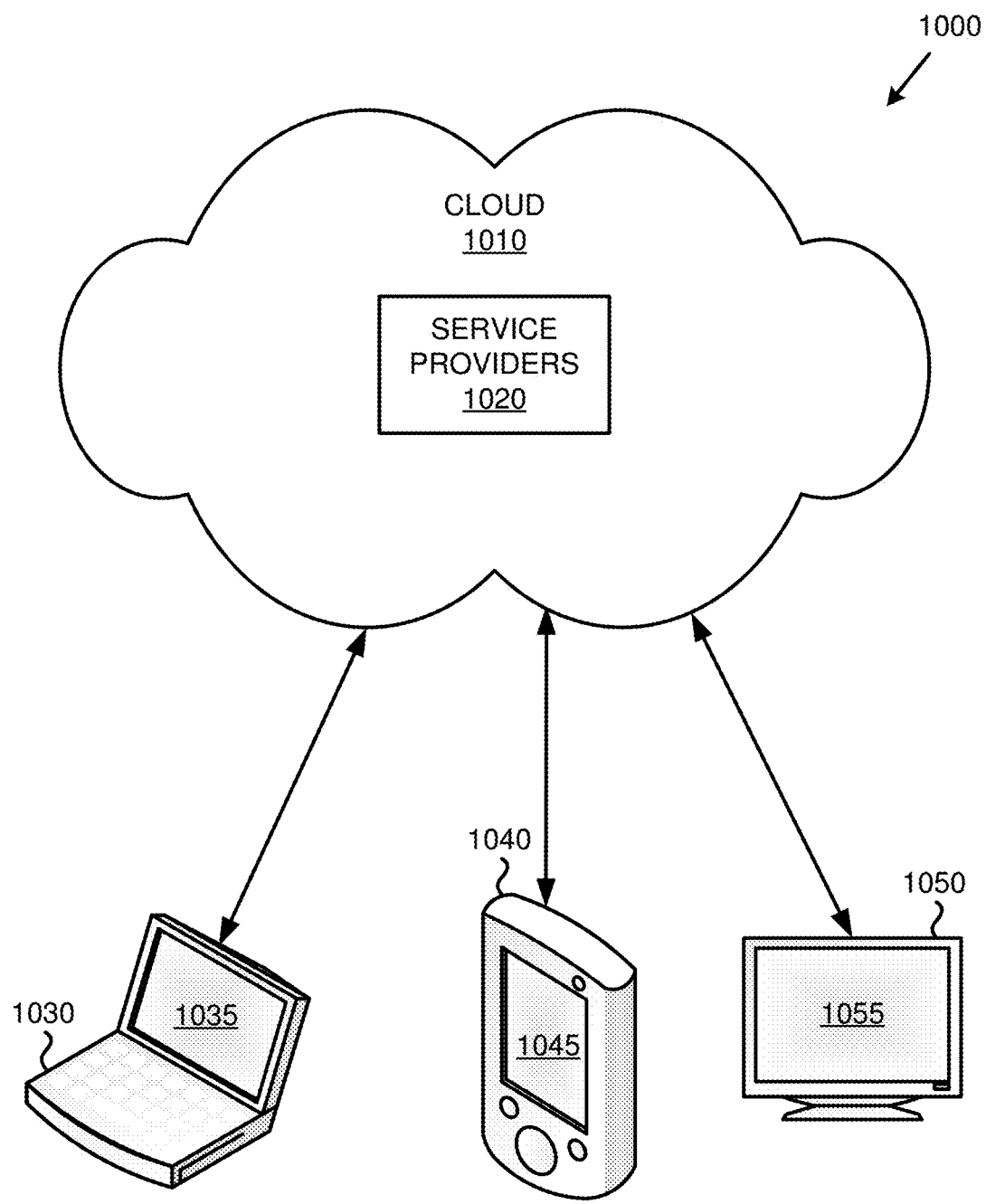
FIG. 10 is an example cloud-support environment that can be used in conjunction with the technologies described herein.

FIG. 10 illustrates a generalized example of a suitable cloud-supported environment 1000 in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050) while other tasks (e.g., storage of data to be used in subsequent processing) can be performed in the cloud 1010.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like. One or more of the connected devices 1030, 1040, 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touchscreen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 9, computer-readable storage media include memory 920 and 925, and storage 940. The term computer-readable storage media does not include signals and carrier waves. In addition, the term computer-readable storage media does not include communication connections, such as 970.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the invention is defined by the following claims. I therefore claim as my invention all that comes within the scope and spirit of these claims.

I claim:

1. A computer-implemented method comprising:
receiving an input representing a web page, the page comprising a plurality of HTML (HyperText Markup Language) elements;
analyzing an HTML Document Object Model (DOM) of the web page, wherein analyzing the HTML DOM comprises:
identifying at least a first container and a second container within the web page by traversing through the web page using DOM scraping, wherein each of the first container and the second container comprises at least one mechanism for receiving user input;
analyzing one or more first-level relationships having a direct relationship between HTML elements within at least one of the first container and the second container, and
analyzing one or more second-level relationships between the first container and the second container;
extracting from the DOM the HTML elements within the first and second containers;
processing the extracted HTML elements utilizing a machine learning algorithm to predict test steps for the extracted HTML elements, wherein the processing is based at least in part on the analyzed one or more first-level relationships and the analyzed one or more second-level relationships;
generating, based on the predicted test steps and the analyzed one or more first-level relationships and the analyzed one or more second-level relationships, at least one prediction for at least one test case scenario; and
converting the at least one prediction into:
a set of human-readable instructions, and
a set of machine-readable instructions.

2. The computer-implemented method of claim 1, wherein converting the prediction into a set of human-readable instructions comprises generating at least one test case document.

3. The computer-implemented method of claim 2, wherein the generating at least one test case document comprises:
generating a list of one or more test case scenarios;
receiving user input selecting at least one of the one or more listed test case scenarios; and
generating the test case document based on the at least one selected test case scenario.

4. The computer-implemented method of claim 1, wherein converting the prediction into a set of machine-readable instructions comprises generating at least one automation script.

5. The computer-implemented method of claim 4, wherein the generating at least one automation script comprises generating an automation script for at least one selected test case scenario generated in a test case document.

6. The computer-implemented method of claim 4, wherein the generating at least one automation script comprises:
generating a list of one or more test case scenarios;
receiving user input selecting at least one of the one or more listed test case scenarios; generating at least one test case document based on the at least one selected test case scenario; and
generating the at least one automation script based on the at least one test case document.

7. The computer-implemented method of claim 1, wherein the extracted HTML elements comprise a plurality of mechanisms for receiving user input.

8. The computer-implemented method of claim 7, wherein generating the prediction comprises determining one or more potential user actions for one or more of the plurality of user input mechanisms.

9. The computer-implemented method of claim 8, wherein determining one or more potential user actions for one or more of the plurality of user input mechanisms comprises determining one or more potential user actions for each of the plurality of user input mechanisms.

10. The computer-implemented method of claim 1, wherein the input comprises a Uniform Resource Locator (URL) or an application name.

11. The computer-implemented method of claim 1, wherein the set of human-readable instructions comprises:
at least one step corresponding to one or more of the HTML elements within the first container; and
at least one additional step corresponding to one or more of the HTML elements within the second container.

12. A computing system comprising:
one or more memories;
one or more processors coupled to the one or more memories; and
one or more non-transitory computer readable storage media storing instructions that, when executed, cause the one or more processors to perform operations for predicting test cases for a web page, the operations comprising:
receiving an input representing the web page, the page comprising a plurality of HTML (HyperText Markup Language) elements;
analyzing an HTML Document Object Model (DOM) of the web page, wherein analyzing the HTML DOM comprises:
identifying at least a first container and a second container within the web page by traversing through the web page using DOM scraping, wherein each of the first container and the second container comprises at least one mechanism for receiving user input;
analyzing one or more first-level relationships having a direct relationship between HTML elements within at least one of the first container and the second container, and
analyzing one or more second-level relationships between the first container and the second container;
extracting from the DOM the HTML elements within the first and second containers;
processing the extracted HTML elements utilizing a machine learning algorithm to predict test steps for the extracted HTML elements, wherein the processing is based at least in part on the analyzed one or more first-level relationships and the analyzed one or more second-level relationships;

generating, based on the predicted test steps and the analyzed one or more first-level relationships and the analyzed one or more second-level relationships, at least one prediction for at least one test case scenario; and converting the at least one prediction into:
 a set of human-readable instructions, and
 a set of machine-readable instructions.

13. The computing system of claim 12, wherein the at least one prediction comprises a plurality of test case scenarios.

14. The computing system of claim 13, wherein the operations further comprise:
generating a list of the plurality of test case scenarios;
receiving a user selection of at least one of the plurality of test case scenarios; and
responsive to receiving the user selection, converting the selected at least one of the plurality of test case scenarios into at least one set of human-readable instructions, the at least one set of human-readable instructions comprising a test case document.

15. The computing system of claim 13, wherein the operations further comprise:
generating a list of the plurality of test case scenarios, wherein the list comprises at least one predicted validation step;
receiving a user selection of at least one of the plurality of test case scenarios comprising a predicted validation step;
responsive to receiving the user selection, converting the selected at least one of the plurality of test case scenarios into at least one set of machine-readable instructions;
using the at least one set of machine-readable instructions, performing validation to test at least one function of the web page, and generating a validation result indicating whether the at least one function of the web page is functioning properly.

16. The computing system of claim 13, wherein the computing system further comprises a display device, and wherein operations further comprise:
presenting a display to a user comprising a list of the plurality of test case scenarios;
receiving a user selection of at least one of the presented plurality of test case scenarios; and
responsive to receiving the user selection, converting the selected at least one test case scenario into a set of human-readable instructions comprising a test case document and a set of machine-readable instructions comprising an automation script.

17. The computing system of claim 16, wherein the display is presented in at least one of: a chatbot window, a web application, a standalone desktop application, or a REST API endpoint.

18. A computer-implemented method comprising:
receiving an input representing a web page, the page comprising a plurality of HTML (HyperText Markup Language) elements;
analyzing an HTML Document Object Model (DOM) of the web page, wherein analyzing the HTML DOM comprises:
 identifying at least a first container and a second container within the web page by traversing through the web page using DOM scraping, wherein each of the first container and the second container comprises at least one mechanism for receiving user input;
 analyzing one or more first-level relationships having a direct relationship between HTML elements within at least one of the first container and the second container, and
 analyzing one or more second-level relationships between the first container and the second container;
extracting from the DOM the HTML elements within the first and second containers;
processing the extracted HTML elements utilizing a machine learning algorithm to predict test steps for the extracted HTML elements, wherein the processing is based at least in part on the analyzed one or more first-level relationships and the analyzed one or more second-level relationships;
generating, based on the predicted test steps and the analyzed one or more first-level relationships and the analyzed one or more second-level relationships, a plurality of predictions for test case scenarios;
receiving a user selection of at least one of the plurality of predictions; and
converting the at least one selected prediction into:
 a set of human-readable instructions comprising a test case document, and
 a set of machine-readable instructions comprising an automation script.

19. The computer-implemented method of claim 18, further comprising:
receiving user input specifying a validation point for addition to the at least one selected prediction, and adding the specified validation point to the at least one selected prediction.

20. The computer-implemented method of claim 18, further comprising:
presenting to a user a validation point proposed for addition to the at least one selected prediction, wherein the validation point is presented at least in part based on a determination that a similar validation point was previously added by a second user.

* * * * *